US012446745B2

(12) United States Patent
Seitz

(10) Patent No.: US 12,446,745 B2
(45) Date of Patent: Oct. 21, 2025

(54) UNOPENABLE CANISTER FOR VACUUM CLEANER

(71) Applicant: Michael W. Seitz, Houston, TX (US)

(72) Inventor: Michael W. Seitz, Houston, TX (US)

( * ) Notice: Subject to any disclaimer, the term of this patent is extended or adjusted under 35 U.S.C. 154(b) by 571 days.

(21) Appl. No.: 17/438,508

(22) PCT Filed: Mar. 13, 2020

(86) PCT No.: PCT/US2020/022547
§ 371 (c)(1),
(2) Date: Sep. 13, 2021

(87) PCT Pub. No.: WO2020/186136
PCT Pub. Date: Sep. 17, 2020

(65) Prior Publication Data
US 2022/0125259 A1 Apr. 28, 2022

Related U.S. Application Data

(60) Provisional application No. 62/817,669, filed on Mar. 13, 2019.

(51) Int. Cl.
| | | |
|---|---|---|
| *B01D 45/00* | (2006.01) | |
| *A47L 9/16* | (2006.01) | |
| *B01D 45/16* | (2006.01) | |
| *B01D 50/20* | (2022.01) | |
| *B04C 3/06* | (2006.01) | |
| *B04C 9/00* | (2006.01) | |

(52) U.S. Cl.
CPC .......... *A47L 9/1683* (2013.01); *A47L 9/1608* (2013.01); *A47L 9/165* (2013.01); *A47L 9/1666* (2013.01);
(Continued)

(58) Field of Classification Search
CPC ...... A47L 9/1683; A47L 9/1608; A47L 9/165; A47L 9/1666; A47L 9/1691;
(Continued)

(56) References Cited

U.S. PATENT DOCUMENTS 3,955,236 A * 5/1976 Mekelburg .............. E04D 15/07
55/482
4,171,208 A 10/1979 Lowder
(Continued)

FOREIGN PATENT DOCUMENTS

JP 2015119878 A * 7/2015
WO WO-2005051155 A1 * 6/2005 ............... A47L 9/00

OTHER PUBLICATIONS

Machine-generated English translation of JP 2015-119878 A, published Jul. 2, 2015.*

*Primary Examiner* — Frank M Lawrence, Jr.
(74) *Attorney, Agent, or Firm* — John R. Casperson

(57) ABSTRACT

A dust container for a vacuum cleaner comprises a vessel, a reed valve, and a filter. The vessel has a longitudinal axis and an annular cross section transverse to the longitudinal axis. The vessel has a first end and a second end, a tangential inlet near the first end, and an axial outlet at the first end. The second end is closed, and the vessel is impervious except for the inlet and the outlet. A vacuum actuated valve biased toward a closed position is positioned to seal the inlet of the vessel, and a filter is positioned in covering relationship with the outlet of the vessel. Dust is trapped within the vessel which can be disposed of as a unit together with the valve and filter and can be replaced with a fresh unit.

15 Claims, 4 Drawing Sheets

(52) U.S. Cl.
CPC ............ *A47L 9/1691* (2013.01); *B01D 45/16* (2013.01); *B01D 50/20* (2022.01); *B04C 3/06* (2013.01); *B04C 9/00* (2013.01); *B04C 2009/004* (2013.01)

(58) Field of Classification Search
CPC ........ A47L 9/1418; A47L 9/1409; A47L 9/16; B04C 3/06; B04C 9/00; B04C 2009/004; B01D 45/16; B01D 45/00; B01D 45/12; B01D 45/18; B01D 50/20
USPC ........................................ 55/428, 429, 459.1
See application file for complete search history.

(56) References Cited

U.S. PATENT DOCUMENTS

| | | |
|---|---|---|
| 6,012,200 A | 1/2000 | Murphy et al. |
| 6,122,796 A | 9/2000 | Downham et al. |
| 6,171,356 B1 * | 1/2001 | Twerdun ................ B01D 45/12 55/459.1 |
| 7,137,169 B2 | 11/2006 | Murphy et al. |
| 7,789,922 B1 | 9/2010 | Wai |
| 2002/0020154 A1 * | 2/2002 | Yang .................... A47L 9/1666 55/428 |
| 2004/0055470 A1 * | 3/2004 | Strauser ................ B01D 50/20 96/417 |
| 2005/0115409 A1 * | 6/2005 | Conrad .................. A47L 9/1641 95/271 |
| 2007/0062000 A1 | 3/2007 | Murphy et al. |
| 2007/0163075 A1 | 7/2007 | Butler |
| 2007/0209336 A1 * | 9/2007 | Conrad .................... A47L 5/28 55/467 |
| 2007/0294858 A1 | 12/2007 | Murphy |
| 2013/0263406 A1 * | 10/2013 | Amisani .................. A47L 9/10 15/347 |
| 2017/0245711 A1 * | 8/2017 | Son ........................ A47L 9/1608 |
| 2018/0177358 A1 * | 6/2018 | Conrad .................... B65F 1/105 |
| 2018/0271343 A1 * | 9/2018 | Hyun .................... A47L 9/1666 |

* cited by examiner

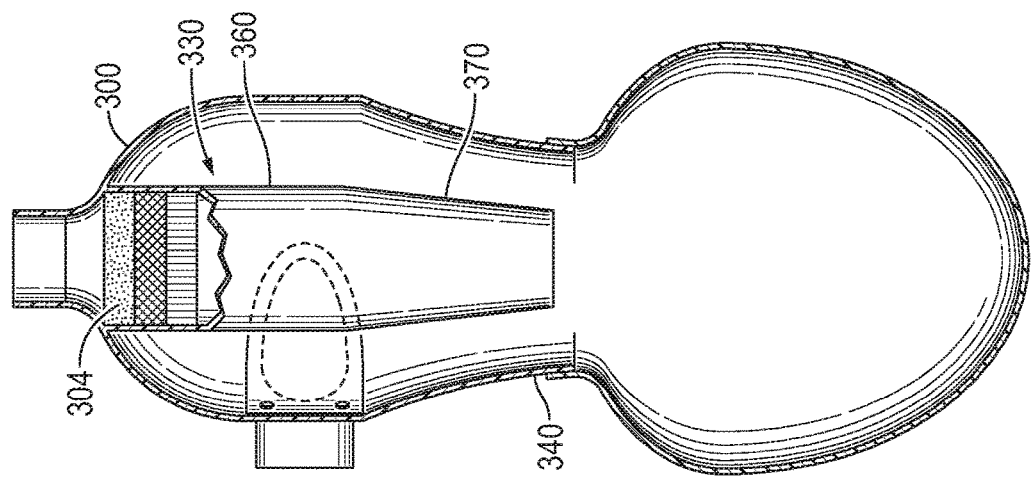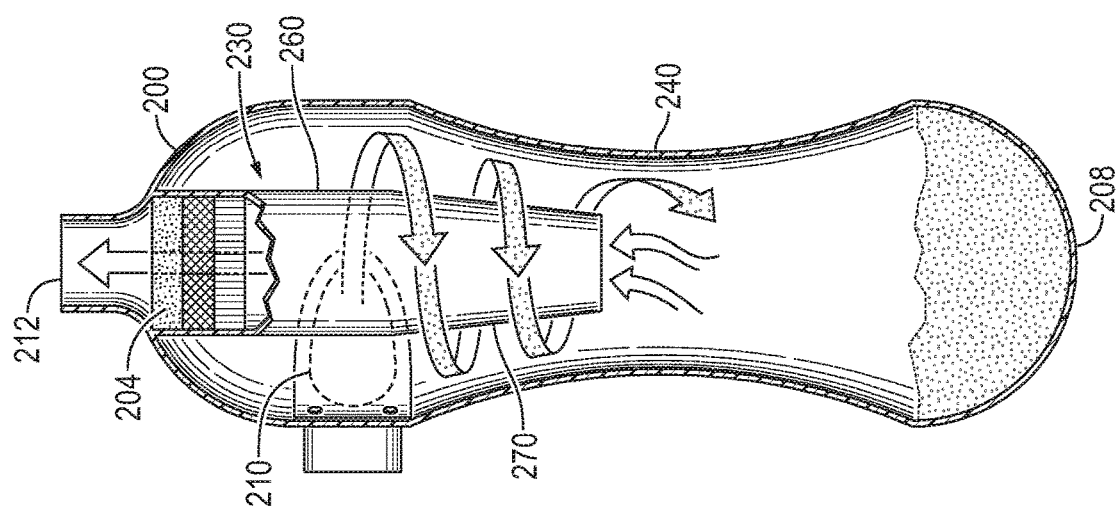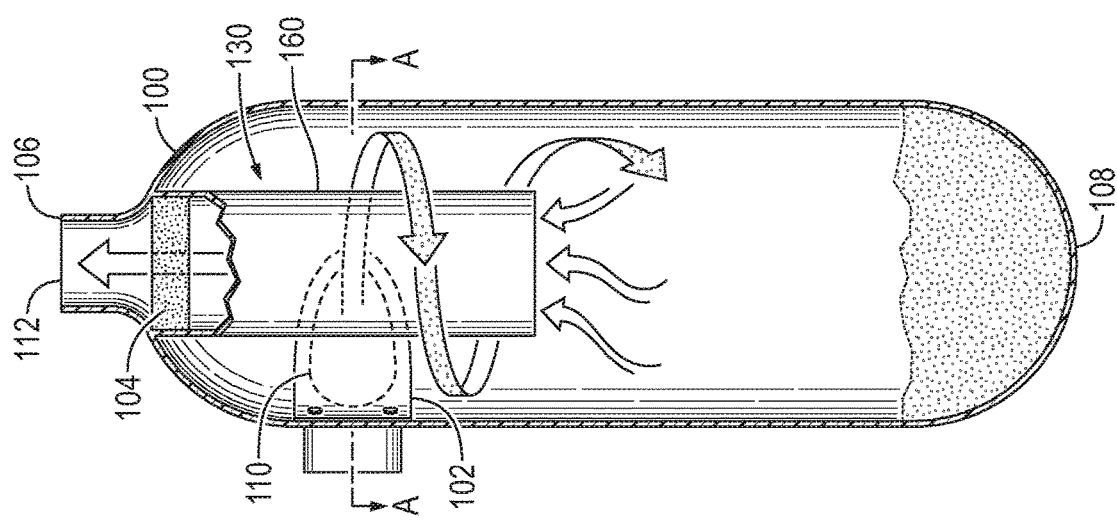

UNOPENABLE CANISTER FOR VACUUM CLEANER

TECHNICAL FIELD

This invention relates to vacuum cleaners. In one embodiment of the invention, an unopenable canister for a vacuum cleaner is provided.

BACKGROUND ART

Vacuum cleaners for household and industrial uses have been made for many years. All employ a receptacle for holding collected dust. All expose the user to the dust when the receptacle is emptied or removed. A vacuum cleaner with a disposable impervious receptacle for holding the dust would be very desirable.

It is an object of this invention to provide a vacuum cleaner with a disposable impervious receptacle for holding the collected dust.

It is another object of this invention to provide a disposable impervious container for use with a canister type vacuum cleaner.

DISCLOSURE OF INVENTION

In one embodiment of the invention, an apparatus is provided comprising a vessel, a vacuum actuated valve, and a filter. The vessel has a longitudinal axis and an annular cross section transverse to the longitudinal axis. The vessel has a first end and a second end, a tangential inlet near the first end, and an axial outlet at the first end. The second end is closed, and the vessel is impervious except for the inlet and the outlet. A vacuum actuated valve biased toward a closed position is positioned to seal the inlet of the vessel, and a filter is positioned in covering relationship with the outlet of the vessel.

When the vessel is used in conjunction with a vacuum cleaner to collect dust, dust that is retained in the vessel is isolated from the outside of the vessel by the impervious sidewall, the vacuum actuated valve, and the filter. The vessel can simply be removed as a unit from the vacuum cleaner and disposed of with no fuss, no muss.

By using a HEPA filter, viruses can be trapped with the dust, to provide a more effective cleaning and to prevent further infection.

Another embodiment of the invention is a vacuuming method. The method
employs first and second impervious vessels and a fixture. The first impervious empty vessel has a longitudinal axis, an inlet selectively sealed by a vacuum actuated valve such as a reed valve and an outlet selectively sealed by a filter against passage of particles of over a predetermined size is positioned in a fixture having a fan to draw dusty air through the inlet and exhaust cleansed air though the outlet and position the vessel in an upright position. The fan is actuated to draw dusty air into the first vessel and exhaust cleansed air though the outlet. Dust is collected in a lower end of the first vessel. The first vessel containing the dust is removed from the fixture. A second impervious empty vessel identical to the first vessel is then positioned in the fixture, the fan is actuated, and dust is collected in the second vessel.

BRIEF DESCRIPTION OF THE DRAWINGS

FIG. 1 is a side view of a vessel in accordance with an embodiment of the invention, in partial section, with dusty air flow illustrated schematically.

FIG. 2 is a side view of a vessel in accordance with another embodiment of the invention, in partial section, with dusty air flow illustrated schematically.

FIG. 3 is a side view of a vessel in accordance with further embodiment of the invention, in partial section.

BEST MODE FOR CARRYING OUT THE INVENTION

Figure 4:
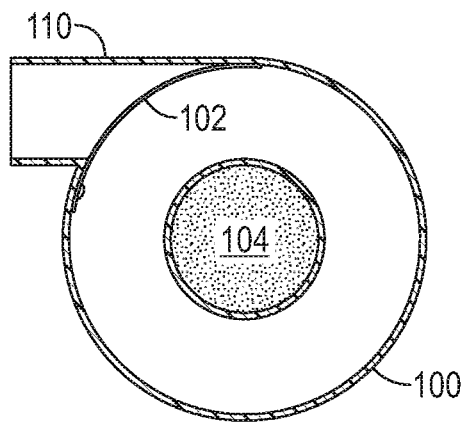
FIG. 4 is a sectional view along lines A-A of FIG. 1, illustrating a feature of FIG. 1 in a valve closed position.
Figure 5:
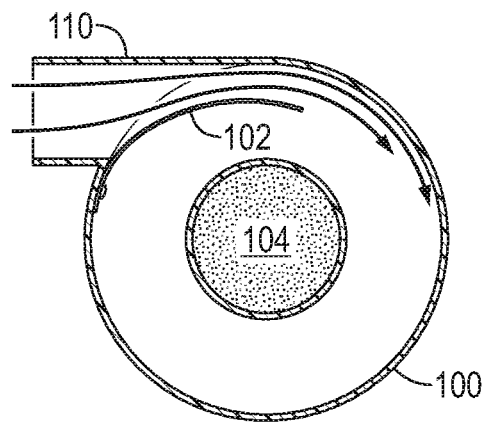
FIG. 5 is a sectional view of the device shown in FIG. 4 in a valve open position.
Figure 6:
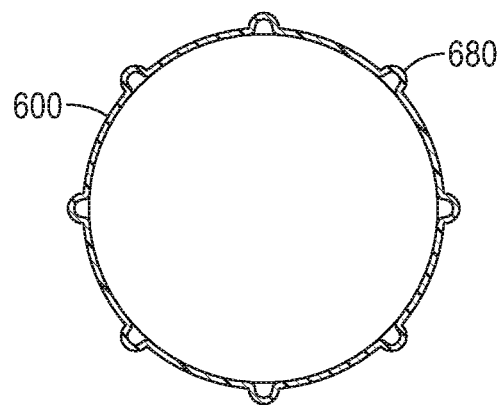
FIG. 6 is a cross sectional view of a vessel of the type shown in FIG. 1 showing one type of hollow reinforcing ribs.
Figure 8:
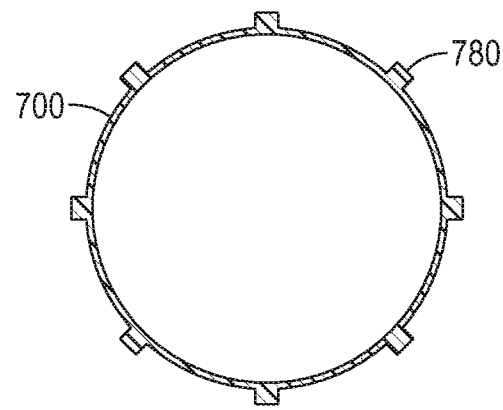
FIG. 8 is a cross sectional view of a vessel of the type shown in FIG. 1 showing a type of solid reinforcing ribs.
Figure 7:
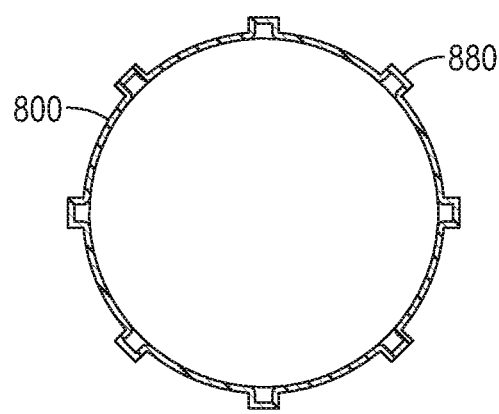
FIG. 7 is a cross sectional view of a vessel of the type shown in FIG. 1 showing another type of hollow reinforcing ribs.

In one embodiment of the invention, an apparatus is provided comprising a vessel 100, 200, 300, 600, 700, 800, 900, 1000, 1100, 1200, a vacuum actuated valve 102 (see FIGS. 4 and 5, taken along cut line A-A in FIG. 1 showing the valve in closed and open positions), and a filter 104, 204, 304. The vessel has a longitudinal axis and an annular cross section transverse to the longitudinal axis. The vessel has a first end 106 and a second end 108, a tangential inlet 110, 210 near the first end, and an axial outlet 112, 212 at the first end. The second end 108, 208 is closed, and the vessel is impervious except for the inlet and the outlet. A vacuum actuated valve 102, preferably a reed valve, is biased toward a closed position positioned to seal the inlet of the vessel, and the filter 104, 204 positioned in covering relationship with the outlet of the vessel to seal the outlet against passage of particles of over a predetermined size.

Figure 13:
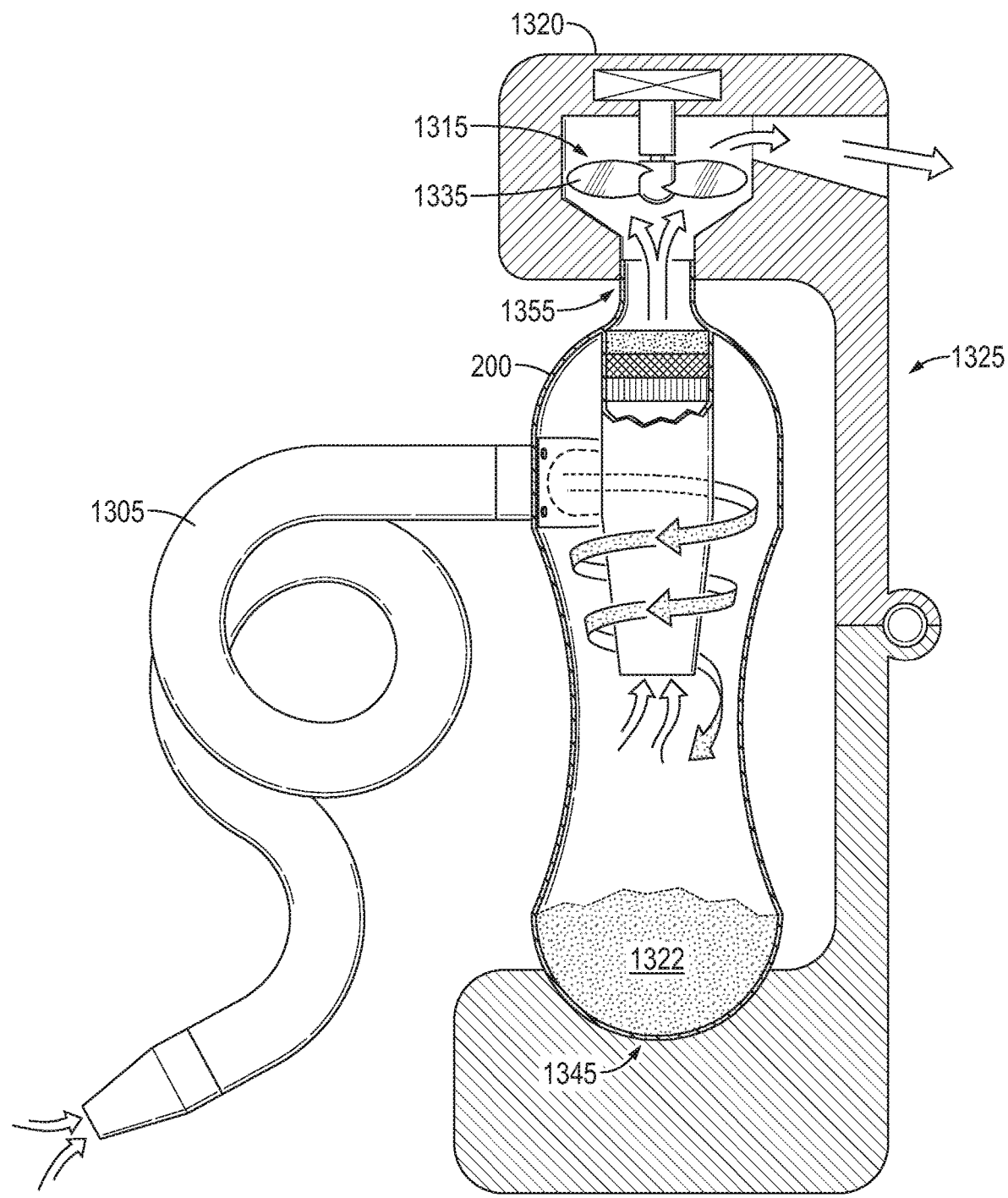
FIG. 13 is a sectional view, partly in schematic, showing an embodiment of the invention is use in a vacuuming operation.

When the vessel, for example, vessel 200, is used in conjunction with a vacuum cleaner, for example, vacuum cleaner 1320, see FIG. 13, to collect dust 1322, dust that is retained in the vessel is isolated from the outside of the vessel by the impervious sidewall, the vacuum actuated valve, and the filter. It can simply be removed as a unit from the vacuum cleaner and disposed of with no fuss, no muss.

The vessel is intended to be safely disposed of after use, and as such is not designed to be opened for dust removal. In other words, the vessel is unopenable without being damaged. It is preferably of monolithic construction and can only be destructively opened. It is preferably self-standing. Suitable materials of construction are thermoplastics such as polyethylene terephthalate or polyolefins such as polyethylene or polypropylene. Glass is also suitable. For convenience of construction, the vessel can be cast in halves and welded or cemented together after the placement of internals. The vessel can have the general outside shape of a 2-liter soda bottle if desired.

The vessel can be described as having an imaginary parting line across its longitudinal axis dividing it into a first half and a second half with the inlet 110, 210 being located in the first half. The second half forms a reservoir for dust. Preferably, the vessel is dividable into thirds and the inlet is positioned in the third nearest the first end.

The vacuum actuated valve is preferably in the form of a resilient reed valve that generally circumferentially follows an inside surface of the vessel when in the closed position to seal the inlet. See FIG. 4.

The vessel preferably further comprises an outlet tube 130, 230, 330 having a longitudinal axis extending from the first end of vessel coaxially with the longitudinal axis of the vessel. The outlet tube has an annular cross section, preferably circular, and has first end peripherally attached to an inside surface of the vessel surrounding the outlet and an open second end positioned at a longitudinal location between the inlet and the closed second end of the vessel. The filter is mounted in the tube near the first end of the tube. The filter is preferably disc-shaped and closely fits the inside of the tube to prevent bypass of dust. More preferably, the filter is composed of multiple layers. See filter 204. Most preferably, at least one of the layers, preferably the final one, comprises a HEPA filter. The filter layers can vary in filter efficiency as well as in thickness and diameter. Also, if desired, the filter layers can be separated a small amount to provide inter-layer volumes for dust storage.

In one embodiment of the invention, the vessel has a narrowed cross-section 240, 340 between the first and the second end, providing the vessel with a converging section and an expanding section for entering dust. The tube has a cylindrical section 160, 260, 360 extending from the first end and can have a converging section 270, 370 extending from the cylindrical section to the second end of the tube. The vessel can be considered as dividable into longitudinally extending thirds with the largest cross section in the third adjacent the second end. The bottom-most section serves to cause the moving air to slow down and drop its dust load and also provides storage for the dust. The bottom-most section can be bulbous and very large compared to the top sections.

In one embodiment of the invention, the vessel has a narrowed cross-section between the first and the second end, with a smoothly converging section leading to the narrowed cross section and an abruptly diverging section leading from the narrowed cross section to the section of largest cross section. See FIG. 3.

Figure 9:
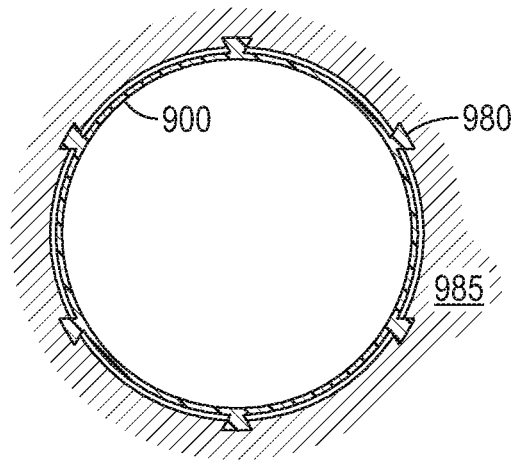
FIG. 9 is a cross sectional view of a vessel of the type shown in FIG. 1 showing another type of solid reinforcing ribs.
Figure 12:
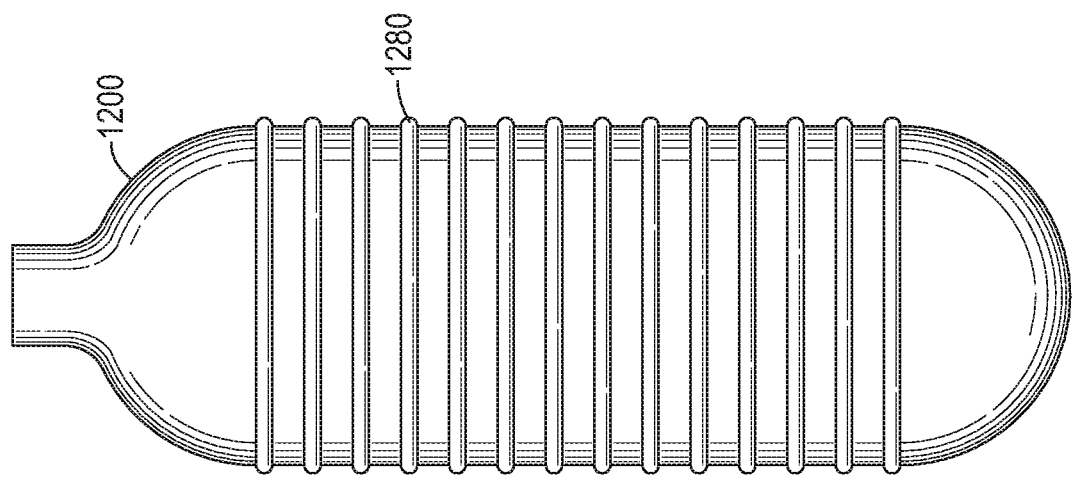
FIG. 12 is a pictorial view of an embodiment of the invention having circumferentially extending reinforcing ribs.
Figure 11:
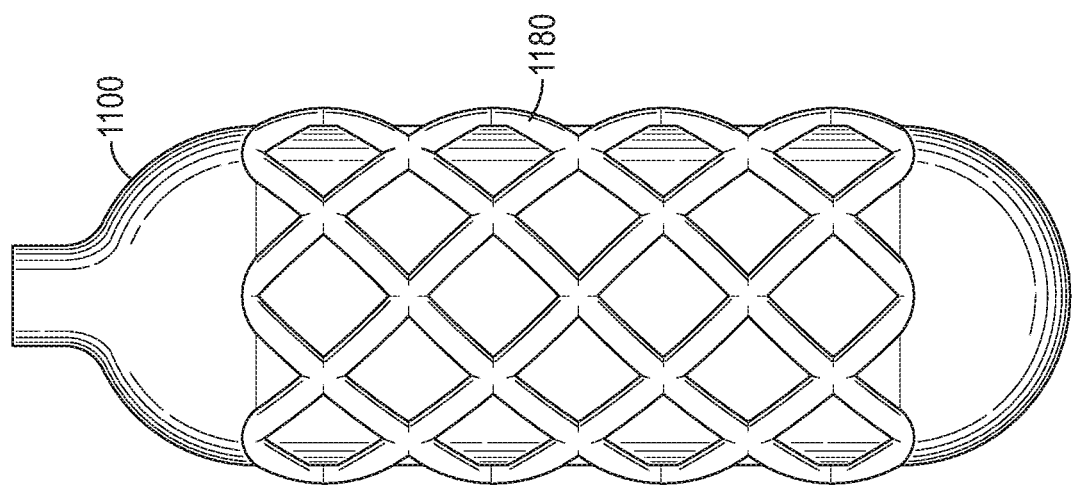
FIG. 11 is a pictorial view of an embodiment of the invention having intersecting reinforcing ribs.
Figure 10:
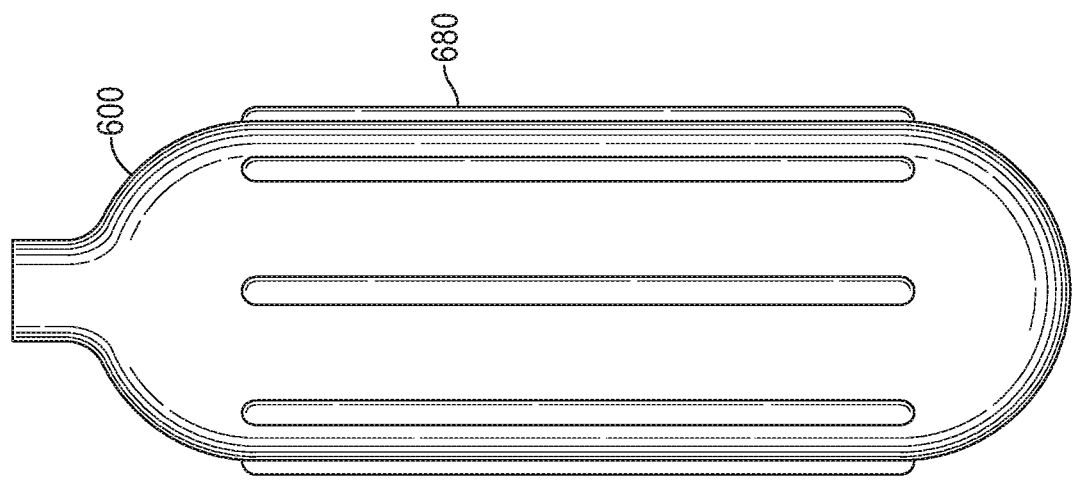
FIG. 10 is a pictorial view of an embodiment of the invention having longitudinal reinforcing ribs.

As shown in FIGS. 6-12, in one embodiment, the vessel has a plurality of collapse-resisting ribs 680, 780, 880, 980, 1180, 1280 formed on its outer surface. The ribs enable the vessel resist collapse with a minimum sidewall thickness when a vacuum is present on the inside. The ribs can extend generally longitudinally, see FIG. 10, generally circumferentially, see FIG. 12, or form a criss-cross pattern, see FIG. 11. The ribs can be hollow, see FIGS. 6 and 7, or solid, see FIGS. 8 and 9. The ribs can be rounded, see FIGS. 6, 10, 11 and 12, or have radially extending sidewalls, see FIGS. 7 and 8. In the embodiment of FIG. 9, the ribs extend longitudinally and are dovetail tenons, for receipt in complementing mortises formed in a frame 985 facing the vessel and receiving the tenons. Any number of ribs and mortises configured to accept them can be employed, for example, in the range of 3 to 100 pairs, usually in the range of 6 to 25 pairs.

With reference to FIG. 13, for use, a hose 1305 is attached to the inlet of the vessel, and a suction device 1315 is attached to the outlet of the vessel. A frame 1325 houses the suction device and retains the vessel in an upright position. The suction device includes a fan 1335 to draw air through the hose, the frame includes a nest 1345 to position a lower end of the vessel, and a quick connect fitting 1355 to connect the suction device to the upper end of vessel. Note that fan 1335 is symbolically illustrated, a radial fan is typically used in vacuum cleaners and is preferred. Also, in FIG. 13, as the dust-laden air travels downwardly in the vessel, it spins faster as the cross-sectional area of flow decreases. The facilitates dust separation against the inside walls of the vessel. The bulbous bottom end of the vessel provides a relatively quiescent volume for dust settlement and storage.

Should the filters become clogged, the vessel can be removed from the frame and tapped downwardly to separate out part of their dust load and extend their service life. The filters are preferably non-serviceable and cannot be removed from the vessel without destruction of either the filters or the vessel. If desired, a tapping device for impacting the vessel can be mounted to the frame to shake loose dust from the filters as vacuuming occurs, or an impulse jet of air or other gas can be periodically directed against the filters in reverse flow to knock lose part of the accumulated dust.

Another embodiment of the invention is a vacuuming method. The method employs first and second impervious vessels and a fixture. A first impervious empty vessel having a longitudinal axis, an inlet selectively sealed by a reed valve and an outlet selectively sealed by a filter is positioned in a fixture having a fan to draw dusty air through the inlet and exhaust cleansed air though the outlet and position the vessel in an upright position. The fan is actuated to draw dusty air into the first vessel and exhaust cleansed air though the outlet. Dust is collected in a lower end of the first vessel. The first vessel containing the dust is removed from the fixture. A second impervious empty vessel is then positioned in the fixture, the fan is actuated, and dust is collected in the second vessel. The method is especially useful when a HEPA filter is employed to clean areas that have been contaminated by viruses such as the coronavirus.

The invention claimed is:

1. Apparatus comprising
a vessel having a longitudinal axis and an annular cross section transverse to the longitudinal axis, said vessel having a first end and a second end, a tangential inlet near the first end, and an axial outlet at the first end, said second end being closed, said vessel being impervious except for the inlet and the outlet,
a vacuum actuated valve biased toward a closed position positioned to seal the inlet, and
a filter positioned in covering relationship with the outlet, wherein the vessel is unopenable without being damaged.

2. Apparatus as in claim 1 wherein the vessel is dividable into thirds and the inlet is positioned in the third nearest the first end.

3. Apparatus comprising
a vessel having a longitudinal axis and an annular cross section transverse to the longitudinal axis, said vessel having a first end and a second end, a tangential inlet near the first end, and an axial outlet at the first end, said second end being closed, said vessel being impervious except for the inlet and the outlet,
a vacuum actuated valve biased toward a closed position positioned to seal the inlet, and
a filter positioned in covering relationship with the outlet, wherein the vessel is of monolithic construction and can only be destructively opened.

4. Apparatus comprising
a vessel having a longitudinal axis and an annular cross section transverse to the longitudinal axis, said vessel having a first end and a second end, a tangential inlet near the first end, and an axial outlet at the first end, said second end being closed, said vessel being impervious except for the inlet and the outlet,
a vacuum actuated valve biased toward a closed position positioned to seal the inlet, and
a filter positioned in covering relationship with the outlet, wherein the vacuum actuated valve is in the form of a resilient reed valve that generally circumferentially follows an inside surface of the vessel when in the closed position to seal the inlet.

5. Apparatus as in claim 4 further comprising
a hose attached to the inlet of the vessel, and
a suction device attached to the outlet of the vessel,
and a frame housing the suction device and retaining the vessel in an upright position.

6. Apparatus comprising
a vessel having a longitudinal axis and an annular cross section transverse to the longitudinal axis, said vessel having a first end and a second end, a tangential inlet near the first end, and an axial outlet at the first end, said second end being closed, said vessel being impervious except for the inlet and the outlet,
a vacuum actuated valve biased toward a closed position positioned to seal the inlet, and
a filter positioned in covering relationship with the outlet, and
a tube having a longitudinal axis extending from the first end of vessel coaxially with the longitudinal axis of the vessel, said tube having an annular cross section and having a first end peripherally attached to an inside surface of the vessel surrounding the outlet and an open second end positioned at a longitudinal location between the inlet and the closed second end of the vessel, the filter being mounted in the tube near the first end of the tube.

7. Apparatus as in claim 6 wherein the filter is non-removable and non-serviceable.

8. Apparatus as in claim 6 wherein the vessel has a narrowed cross-section between the first and the second end, said vessel having a converging section and an expanding section.

9. Apparatus as in claim 8 wherein the tube has a cylindrical section extending from the first end and a converging section extending from the cylindrical section to the second end to promote accelerating cyclonic flow between an inside of the vessel wall and an outside of the tube.

10. Apparatus as in claim 9 wherein the vessel is dividable into thirds and the vessel has its largest cross section in the third adjacent the second end.

11. Apparatus as in claim 10 wherein the vessel has a narrowed cross-section between the first and the second end, said vessel having a smoothly converging section leading to the narrowed cross section and an abruptly diverging section leading from the narrowed cross section to the section of largest cross section.

12. Apparatus comprising
a vessel having a longitudinal axis and an annular cross section transverse to the longitudinal axis, said vessel having a first end and a second end, a tangential inlet near the first end, and an axial outlet at the first end, said second end being closed, said vessel being impervious except for the inlet and the outlet,
a vacuum actuated valve biased toward a closed position positioned to seal the inlet, and
a filter positioned in covering relationship with the outlet,
wherein the vessel is unopenable without being damaged, and
wherein the vessel has a plurality of collapse-resisting ribs formed on its outer surface.

13. Apparatus as in claim 12 wherein the ribs extend longitudinally and are dovetail tenons.

14. Apparatus as in claim 13 further comprising a frame surrounding the vessel, said frame defining a plurality of tenon-receiving mortises facing the vessel and receiving the tenons.

15. A vacuuming method comprising
a) positioning a first apparatus as in claim 1 in a fixture having a fan to draw dusty air through the inlet and exhaust cleansed air though the outlet and position the vessel in an upright position;
b) actuating the fan to draw dusty air into the vessel and exhaust cleansed air though the outlet and collect dust in a lower end of the vessel;
c) removing the vessel containing dust from the fixture; and
d) positioning a second apparatus as in claim 2 in the fixture as in step a) and repeating steps b) and c).

* * * * *